US011038359B2

(12) United States Patent
Alfred

(10) Patent No.: US 11,038,359 B2
(45) Date of Patent: Jun. 15, 2021

(54) MULTIPLE DEVICES CHARGING CASE ASSEMBLY

(71) Applicant: Pamelia Alfred, Crosby, TX (US)

(72) Inventor: Pamelia Alfred, Crosby, TX (US)

( * ) Notice: Subject to any disclaimer, the term of this patent is extended or adjusted under 35 U.S.C. 154(b) by 210 days.

(21) Appl. No.: 16/419,894

(22) Filed: May 22, 2019

(65) Prior Publication Data
US 2020/0373766 A1 Nov. 26, 2020

(51) Int. Cl.
*H01M 10/46* (2006.01)
*H02J 7/00* (2006.01)
*H02J 7/02* (2016.01)
*H01M 50/256* (2021.01)

(52) U.S. Cl.
CPC ......... *H02J 7/0027* (2013.01); *H01M 50/256* (2021.01); *H02J 7/00* (2013.01); *H02J 7/0044* (2013.01); *H02J 7/02* (2013.01)

(58) Field of Classification Search
CPC .......... H02J 7/0044; H02J 7/0045; H02J 7/02; H02J 7/1423; H02J 7/0013; H01M 50/256
USPC ......................... 320/107, 110, 114, 115, 116
See application file for complete search history.

(56) References Cited

U.S. PATENT DOCUMENTS

| | | | |
|---|---|---|---|
| 675,438 A | 6/1901 | Brush | |
| 6,894,457 B2 | 5/2005 | Germagian | |
| 7,696,722 B2* | 4/2010 | Utschig | G01T 7/00 320/114 |
| 8,115,451 B2* | 2/2012 | Griffin, Jr. | H02J 7/0027 320/115 |
| 8,432,124 B2 | 4/2013 | Foster | |
| 2006/0273757 A1 | 12/2006 | Naguib | |
| 2009/0278495 A1* | 11/2009 | Kaye | H02J 7/0027 320/114 |
| 2010/0176762 A1* | 7/2010 | Daymude | H02J 7/0027 320/115 |
| 2012/0262117 A1* | 10/2012 | Ferber | A45F 3/04 320/111 |
| 2013/0193905 A1 | 8/2013 | Wilson | |
| 2014/0175031 A1* | 6/2014 | Roberts | H02J 7/0027 211/26.2 |
| 2016/0056652 A1* | 2/2016 | Hung | H02J 7/0044 320/114 |
| 2016/0329728 A1* | 11/2016 | Strauser | G06F 1/18 |
| 2017/0025883 A1 | 1/2017 | Ball | |
| 2018/0055175 A1 | 3/2018 | Rho | |
| 2018/0062197 A1 | 3/2018 | Thiel | |
| 2019/0067966 A1* | 2/2019 | Zhang | H02J 7/022 |
| 2019/0363555 A1* | 11/2019 | Kung | H02J 7/0044 |

* cited by examiner

*Primary Examiner* — Edward Tso

(57) ABSTRACT

A multiple device charging case assembly for carrying and charging a plurality of electronic devices includes a case that has a terraced interior thereby defining a plurality of storage areas within the case. Each of the storage areas can contain an electronic device that has dimensions corresponding to a respective one of the storage areas. A plurality of charge ports is each positioned within the case and each of the charge ports is positioned in a respective one of the storage areas. In this way each of the charge ports can be placed in electrical communication with the electronic devices in each of the storage areas for charging the electronic device positioned in each of the storage areas.

10 Claims, 5 Drawing Sheets

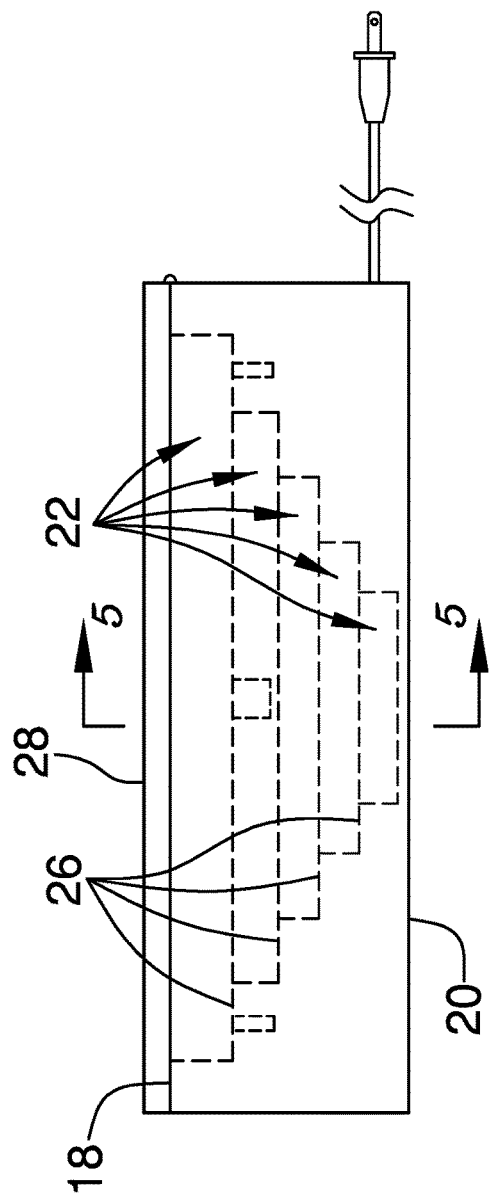
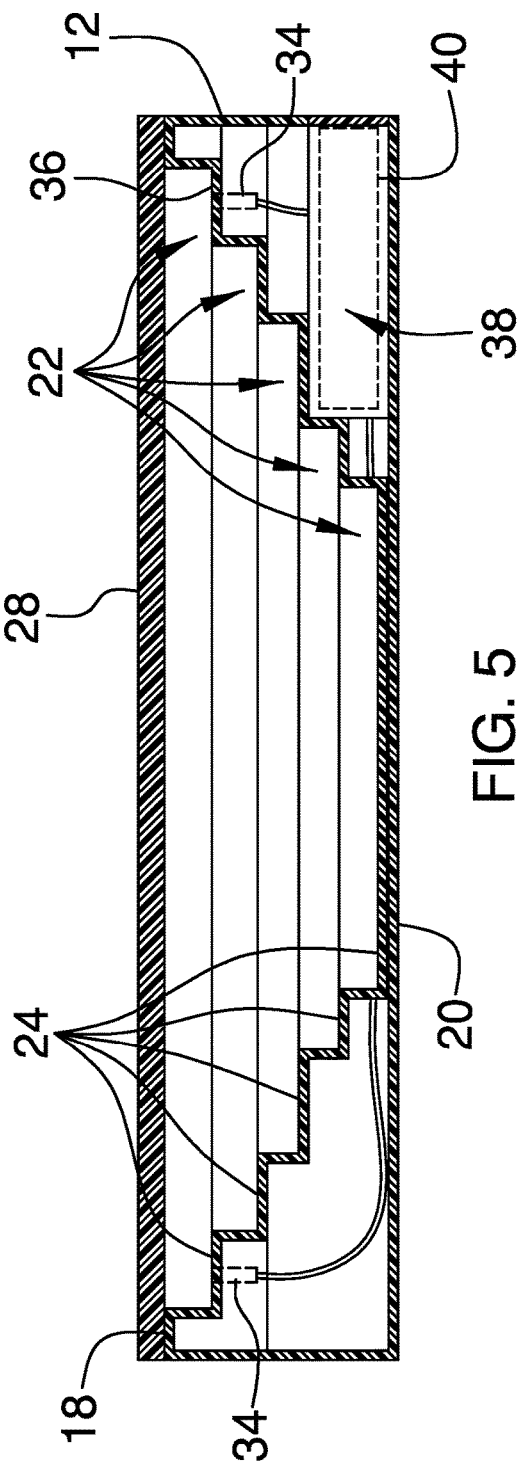
FIG. 4
FIG. 5

US 11,038,359 B2

MULTIPLE DEVICES CHARGING CASE ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to charging case devices and more particularly pertains to a new charging case device for carrying and charging a plurality of electronic devices.

BRIEF SUMMARY OF THE INVENTION

An embodiment of the disclosure meets the needs presented above by generally comprising a case that has a terraced interior thereby defining a plurality of storage areas within the case. Each of the storage areas can contain an electronic device that has dimensions corresponding to a respective one of the storage areas. A plurality of charge ports is each positioned within the case and each of the charge ports is positioned in a respective one of the storage areas. In this way each of the charge ports can be placed in electrical communication with the electronic devices in each of the storage areas for charging the electronic device positioned in each of the storage areas.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a left side phantom view of an embodiment of the disclosure.

FIG. 5 is a cross sectional view taken along line 5-5 of FIG. 4 of an embodiment of the disclosure.

DETAILED DESCRIPTION OF THE INVENTION

Figure 1:
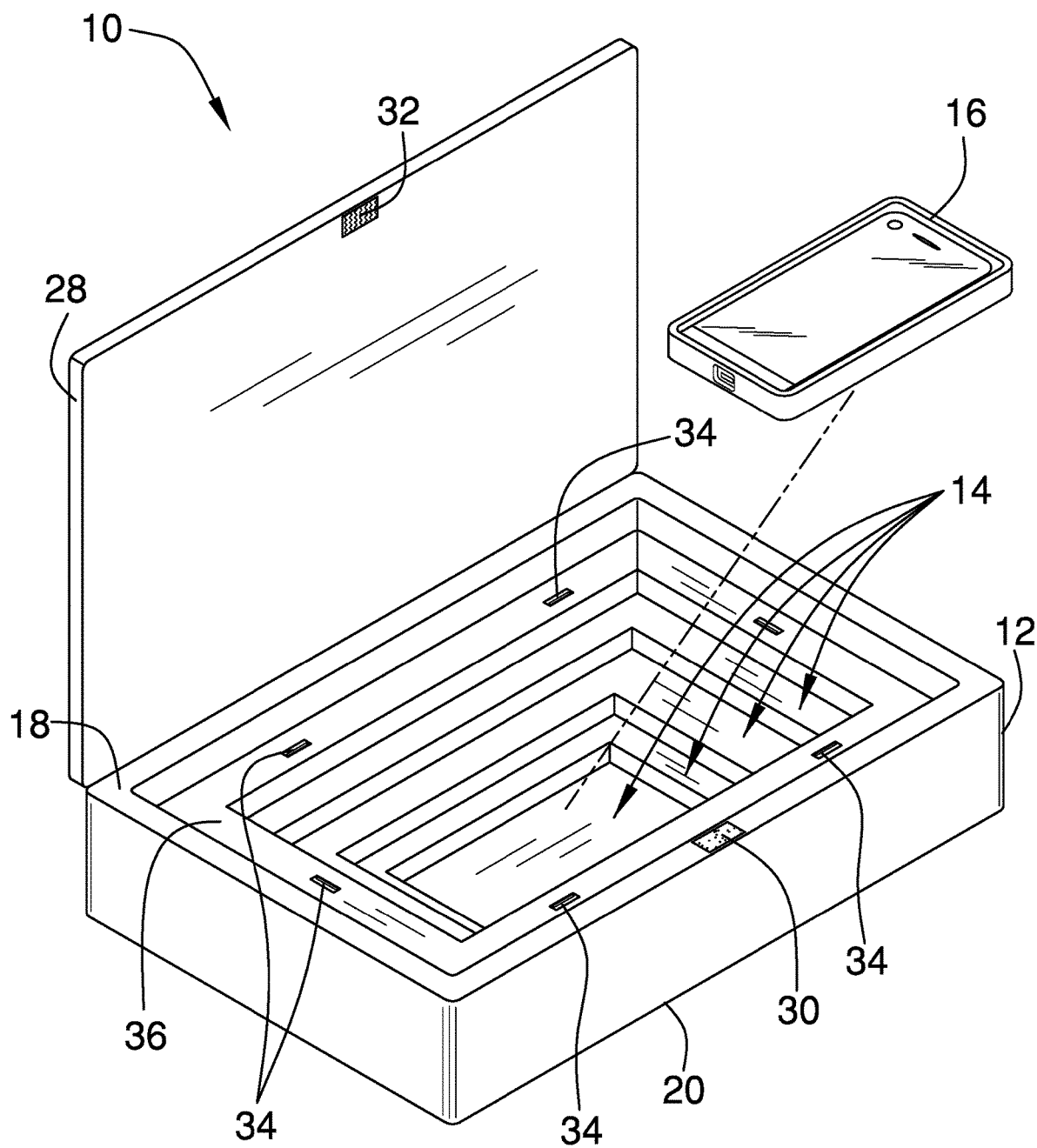
FIG. 1 is a top perspective view of a multiple device charging case assembly according to an embodiment of the disclosure.
Figure 2:
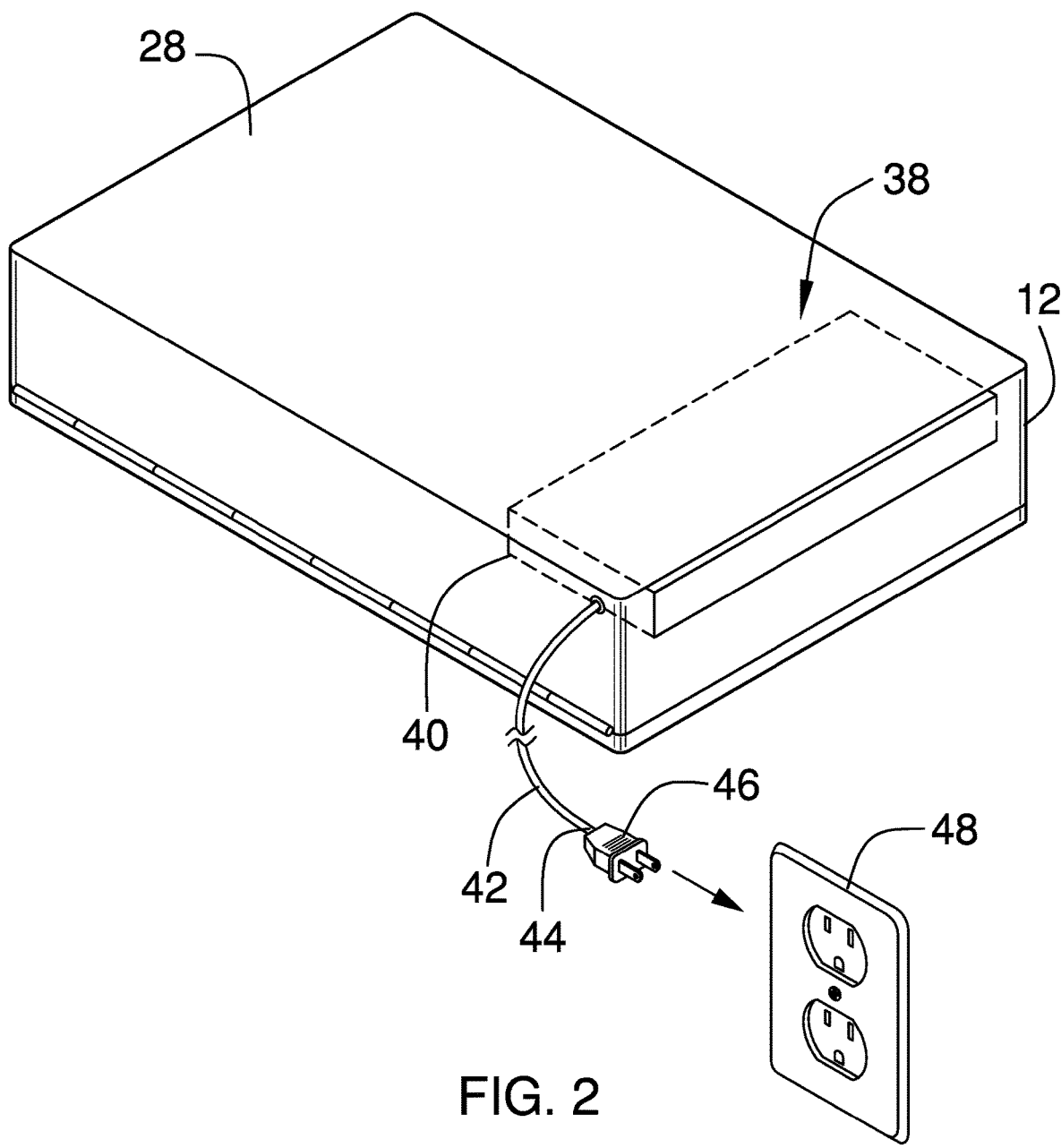
FIG. 2 is a phantom perspective view of an embodiment of the disclosure.
Figure 3:
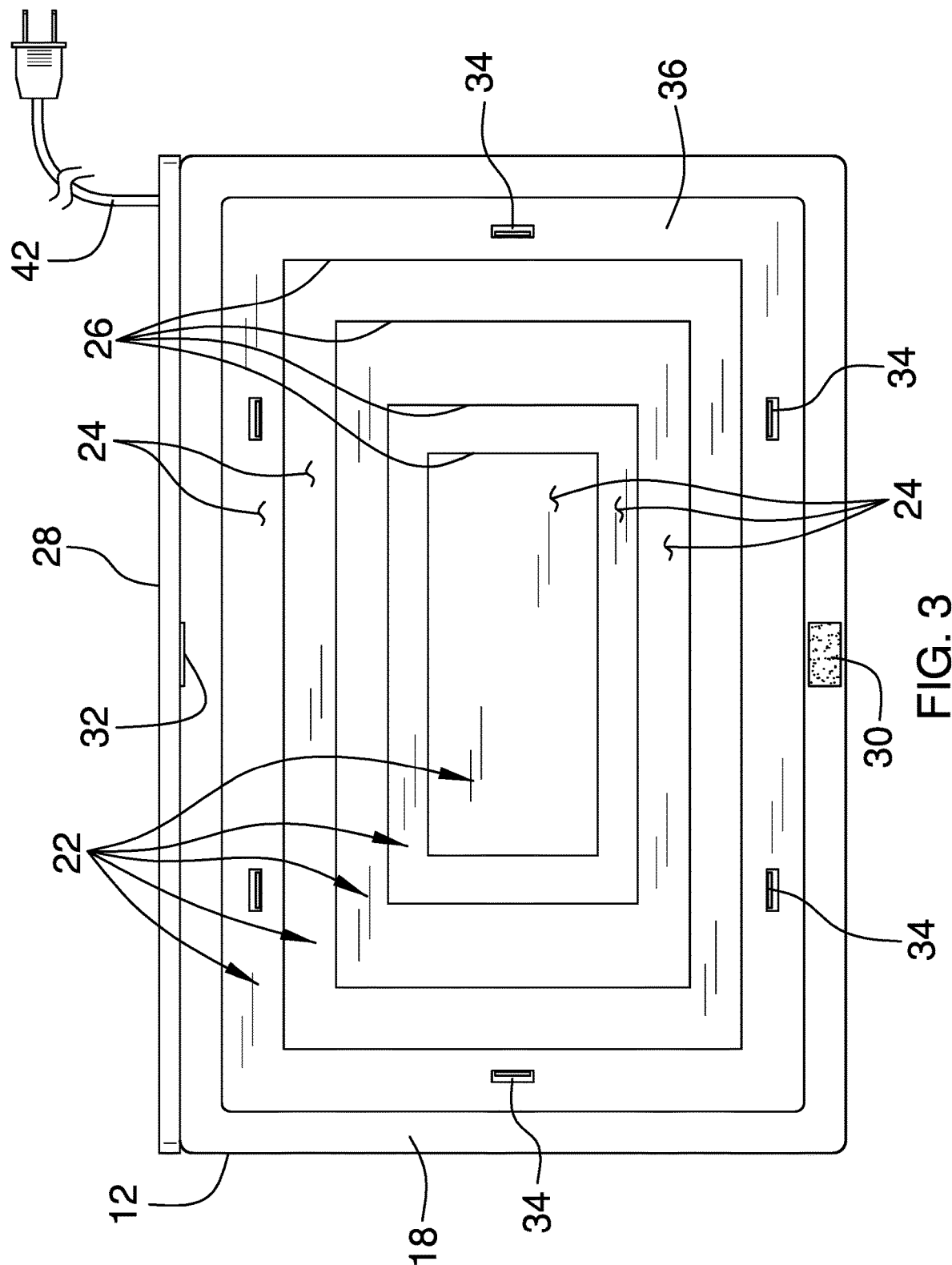
FIG. 3 is a top view of an embodiment of the disclosure.
Figure 6:
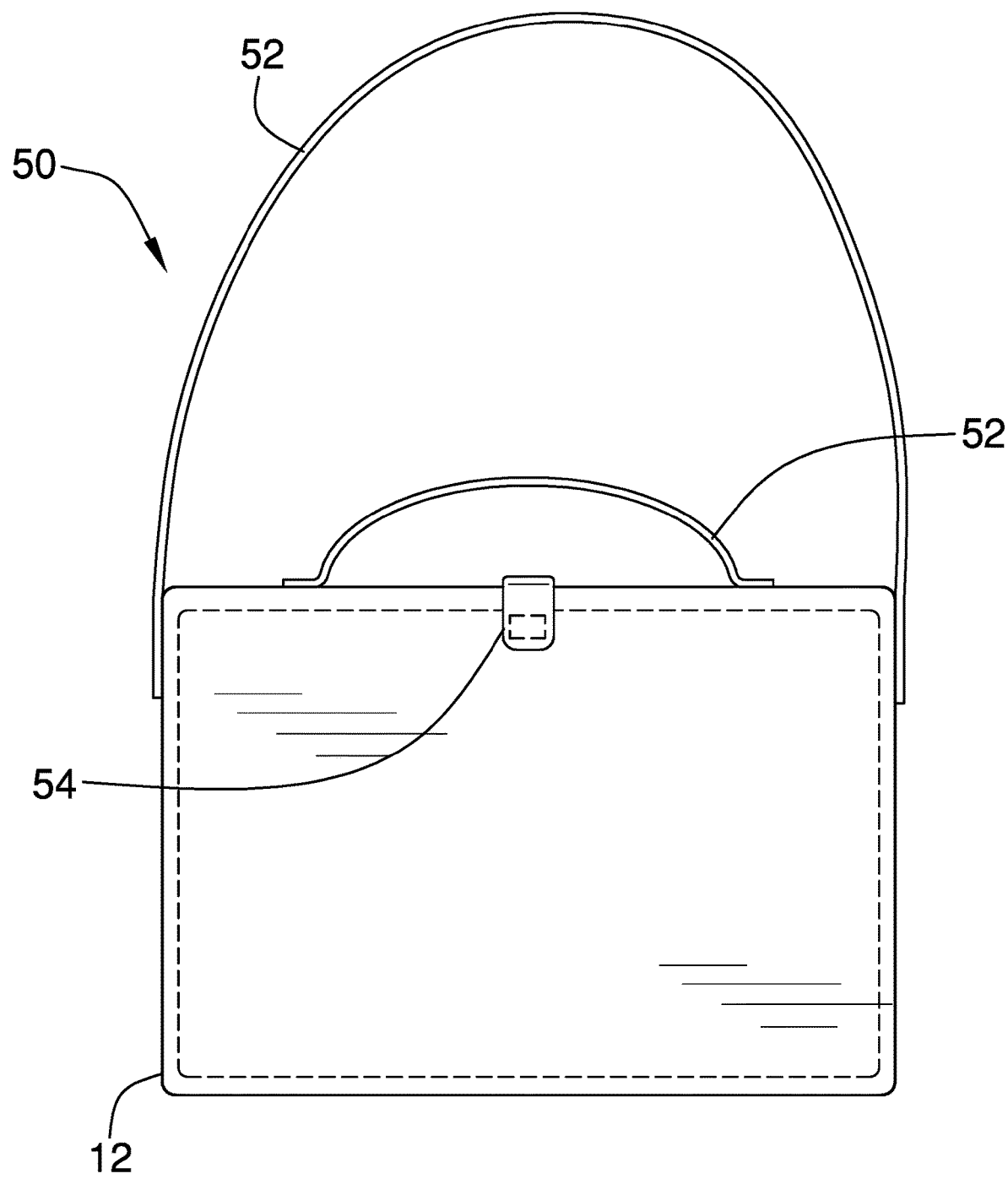
FIG. 6 is a perspective view of an alternative embodiment of the disclosure.

With reference now to the drawings, and in particular to FIGS. 1 through 6 thereof, a new charging case device embodying the principles and concepts of an embodiment of the disclosure and generally designated by the reference numeral 10 will be described.

As best illustrated in FIGS. 1 through 6, the multiple devices charging case assembly 10 generally comprises a case 12 that has a terraced interior thereby defining a plurality of storage areas 14 within the case 12. Each of the storage areas 14 can contain an electronic device 16, such as a smart phone or the like, that has dimensions corresponding to a respective one of the storage areas 14. In this way a plurality of electronic devices 16 of varying dimensions can be restrained within the case 12. The case 12 has a top wall 18 and a bottom wall 20, and the top wall 18 has a plurality of wells 22 each extending toward the bottom wall 20. Each of the wells 22 has a lower bounding surface 24. Additionally, each of the wells 22 has a decreasing length and width from the top wall 18 toward the bottom wall 20 to define a plurality of terraces 26. Each of the terraces 26 defines a respective one of the storage areas 14.

A lid 28 is hingedly coupled to the case 12 for opening and closing the case 12. The lid 28 lies on the top wall 18 of the case 12 when the lid 28 is positioned in a closed position. A first mating member 30 is coupled to the top wall 18 of the case 12 and a second mating member 32 is coupled to a bottom surface of the lid 28. The second mating member 32 releasably engages the first mating member 30 for retaining the lid 28 in the closed position. Each of the first 30 and second 32 mating members may comprise a hook and loop fastener or the like.

A plurality of charge ports 34 is each positioned within the case 12. Each of the charge ports 34 is positioned in a respective one of the storage areas 14. In this way each of the charge ports 34 can be placed in electrical communication with the electronic devices 16 positioned in the case 12 area for charging the electronic devices 16. Moreover, each of the charge ports 34 is recessed into the lower bounding surface 24 of a topmost one of the wells 36. Each of the charge ports 34 may comprise a usb port or other type of electrical port that corresponds to the type of charge port compatible with the electronic devices 16.

A power supply 38 is coupled to the case 12 and the power supply 38 is electrically coupled to each of the charge ports 34. In this way the power supply 38 delivers electrical current to the electronic devices 16 that are plugged into the charge ports 34. The power supply 38 comprises at least one rechargeable battery 40 that is positioned within the case 12. The at least one rechargeable battery 40 is electrically coupled to each of the charge ports 34.

A power cord 42 is coupled to and extends outwardly from the case 12. The power cord 42 is electrically coupled to the at least one rechargeable battery 40 and the power cord 42 has a distal end 44 with respect to the case 12. The distal end 44 has a male plug 46 that is electrically coupled thereto. The male plug 46 can be electrically coupled to a power source 48 comprising a female electrical outlet for charging the at least one rechargeable battery 40. In an alternative embodiment 50 that is most clearly shown in FIG. 6, a plurality of straps 52 may each be coupled to the case 12 for carrying the case 12 by hand or over a shoulder. Continuing in the alternative embodiment 50, a clasp 54 may be coupled to the lid 28 that releasably engages the case 12 for retaining the lid 28 in the closed position.

In use, each of the electronic devices 16 is positioned in one of the wells 22 that has dimensions that correspond to the dimensions of a respective one of the electronic devices 16. In this way the case 12 can securely carry a plurality of electronic devices 16 that have varying dimensions. Each of the electronic devices 16 can be plugged into a respective one of the charge ports 34 when the electronic devices 16 are positioned in the case 12. In this way each of the electronic devices 16 can be charged with the electronic devices 16 are being carried in the case 12. The power cord 42 can be plugged into the power source 48 for recharging the at least one rechargeable battery 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multiple device charging case assembly being configured to contain and charge a plurality of electronic devices, said assembly comprising:
a case having a terraced interior thereby defining a plurality of storage areas within said case wherein each of said storage areas is configured to contain an electronic device having dimensions corresponding to a respective one of said storage areas; and
a plurality of charge ports, each of said charge ports being positioned within said case, each of said charge ports being positioned in a respective one of said storage areas wherein each of said charge ports is configured to be placed in electrical communication with the electronic devices positioned in said storage areas for charging the electronic device.

2. The assembly according to claim 1, wherein said case has a top wall and a bottom wall, said top wall having a plurality of wells each extending toward said bottom wall, each of said wells having a lower bounding surface, each of said wells having a decreasing length and width from said top wall toward said bottom wall to define a plurality of terraces, each of said terraces defining a respective one of said storage areas.

3. The assembly according to claim 2, further comprising a lid being hingedly coupled to said case for opening and closing said case, said lid lying on said top wall of said case when said lid is positioned in a closed position.

4. The assembly according to claim 3, further comprising a first mating member being coupled to said top wall of said case.

5. The assembly according to claim 4, further comprising a second mating member being coupled to a bottom surface of said lid, said second mating member releasably engaging said first mating member for retaining said lid in said closed position.

6. The assembly according to claim 2, wherein each of said charge ports is recessed into said lower bounding surface of a topmost one of said wells.

7. The assembly according to claim 6, further comprising a power supply being coupled to said case, said power supply being electrically coupled to each of said charge ports wherein said power supply is configured to deliver electrical current to the electronic devices being plugged into said charge ports.

8. The assembly according to claim 7, wherein said power supply comprises at least one rechargeable battery being positioned within said case, said at least one rechargeable battery being electrically coupled to each of said charge ports.

9. The assembly according to claim 8, further comprising a power cord being coupled to and extending outwardly from said case, said power cord being electrically coupled to said at least one rechargeable battery, said power cord having a distal end with respect to said case, said distal end having a male plug being electrically coupled thereto wherein said male plug is configured to be electrically coupled to a power source comprising a female electrical outlet for charging said at least one rechargeable battery.

10. A multiple device charging case assembly being configured to contain and charge a plurality of electronic devices, said assembly comprising:
a case having a terraced interior thereby defining a plurality of storage areas within said case wherein each of said storage areas is configured to contain an electronic device having dimensions corresponding to a respective one of said storage areas, said case having a top wall and a bottom wall, said top wall having a plurality of wells each extending toward said bottom wall, each of said wells having a lower bounding surface, each of said wells having a decreasing length and width from said top wall toward said bottom wall to define a plurality of terraces, each of said terraces defining a respective one of said storage areas;

a lid being hingedly coupled to said case for opening and closing said case, said lid lying on said top wall of said case when said lid is positioned in a closed position;
a first mating member being coupled to said top wall of said case;
a second mating member being coupled to a bottom surface of said lid, said second mating member releasably engaging said first mating member for retaining said lid in said closed position;
a plurality of charge ports, each of said charge ports being positioned within said case, each of said charge ports being positioned in a respective one of said storage areas wherein each of said charge ports is configured to be placed in electrical communication with the electronic devices positioned in each of said storage areas for charging the electronic device, each of said charge ports being recessed into said lower bounding surface of a topmost one of said wells; and
a power supply being coupled to said case, said power supply being electrically coupled to each of said charge ports wherein said power supply is configured to deliver electrical current to the electronic devices being plugged into said charge ports, said power supply comprising:
at least one rechargeable battery being positioned within said case, said at least one rechargeable battery being electrically coupled to each of said charge ports; and
a power cord being coupled to and extending outwardly from said case, said power cord being electrically coupled to said at least one rechargeable battery, said power cord having a distal end with respect to said case, said distal end having a male plug being electrically coupled thereto wherein said male plug is configured to be electrically coupled to a power source comprising a female electrical outlet for charging said at least one rechargeable battery.

* * * * *